United States Patent [19]

Hammond et al.

[11] Patent Number: 5,262,643

[45] Date of Patent: Nov. 16, 1993

[54] AUTOMATIC TIP APPROACH METHOD AND APPARATUS FOR SCANNING PROBE MICROSCOPE

[75] Inventors: James M. Hammond; Martin A. Klos, both of Boca Raton, Fla.; Yves Martin, Ossining, N.Y.; Kenneth G. Roessler, Boca Raton, Fla.; Robert M. Stowell, Delray Beach, Fla.

[73] Assignee: International Business Machines Corp., Armonk, N.Y.

[21] Appl. No.: 897,646

[22] Filed: Jun. 12, 1992

[51] Int. Cl.⁵ .......................................... H01V 37/28
[52] U.S. Cl. .................................. 250/306; 250/307; 73/105
[58] Field of Search ................. 250/306, 307; 73/105

[56] References Cited

U.S. PATENT DOCUMENTS

| 4,851,671 | 7/1989 | Pohl | 250/306 |
| 4,952,857 | 8/1990 | West et al. | 318/561 |
| 5,025,658 | 6/1991 | Elings et al. | 73/105 |
| 5,059,793 | 10/1991 | Miyamoto | 250/306 |
| 5,079,958 | 1/1992 | Takase et al. | 73/862.64 |
| 5,148,026 | 9/1992 | Watanabe et al. | 250/306 |

Primary Examiner—Jack I. Berman
Attorney, Agent, or Firm—Romualdas Strimaitis

[57] ABSTRACT

A non-contact, step-wise method for automatically positioning a sensing probe, having a vibrating cantilever and tip, above a target surface utilizing acoustic and Van der Waals interactions respectively during an approach method. The sensing probe is lowered to a substantially optimized tip to target surface distance. The system utilizes the interaction of forces between the vibrating cantilever and target surface to automatically position the sensing probe above the target surface.

30 Claims, 6 Drawing Sheets

AUTOMATIC TIP APPROACH METHOD AND APPARATUS FOR SCANNING PROBE MICROSCOPE

FIELD OF THE INVENTION

The present invention relates to a method and apparatus for automatically positioning a micromachined, microminiature sensing probe for a scanning probe microscope (SPM). More particularly, the invention relates to a method and apparatus for positioning a sensing probe with increasingly precise incremental steps, while maintaining a non-contact mode of operation between the sensing probe and target surface during the entire process.

BACKGROUND OF THE INVENTION

Scanning probe microscopes (SPMs) are instruments that provide high resolution information about surface contours. Vertical movement of a sensing probe, in response to a raster scanning procedure of the sensing probe across a target surface, is used for determining the target surface contour. Implementations of SPM devices are based on the interaction of forces including atomic, electrical potential, magnetic, capacitive, or chemical potential to maintain a constant probe to target surface gap, or distance. One common use of these devices is imaging with some types of SPMs have the capability of imaging individual atoms.

In addition to imaging surface contours, SPMs can be used to measure a variety of physical or chemical properties with detail over the range from a few Angstroms to hundreds of microns. For these applications, SPMs can provide lateral and vertical resolution that is not obtainable from any other type of device. Examples of applications include imaging or measuring the contour properties of transistors, silicon chips, disk surface, crystals, cells, or the like.

In order to provide for optimal operation of the SPM, a scanning probe is positioned over a target surface at a distance within the same order of magnitude as molecular geometries. That is, a distance of one or two atoms, or an order of magnitude of tens of Angstroms. Prior art methods using sensing probes have typically positioned the probe manually at a desired distance from the target surface or by allowing the probe to make contact with the target surface and subsequently backing the probe away from the target surface. Such an embodiment is disclosed, for example, in U.S. Pat. No. 5,025,658.

The prior art methods of positioning the scanning probe tip have several shortcomings. The initial positioning process for tolerances in the microscopic range is one that is inherently critical. As noted, optimal scanning probe microscope operation necessitates positioning the sensing probe above the target surface at a distance within an order of magnitude of molecular geometries. The necessity of human interaction results in questionable reliability and, further, is time consuming. In addition, allowing the scanning probe to make physical contact with the target surface during calibration or set up may damage, or otherwise make unusable, the target device/substance or scanning tip.

OBJECTS OF THE INVENTION

It is therefore an object of the present invention to provide a scanning probe microscope using an automatic initial positioning procedure requiring no operator interaction.

It is another object of the present invention to provide a method of positioning a sensing probe for a scanning probe microscope above the surface of a target surface without making contact with the target surface.

SUMMARY OF THE INVENTION

The present invention provides an apparatus and procedure for automatically positioning a sensing probe above a target surface. The sensing probe comprises a cantilever having a microminiature tip integrally formed or mounted at one end. The cantilever is energized by a piezoelectric element which vibrates the cantilever/tip combination. The vibrating cantilever is characterized as having a resonant frequency with an amplitude of vibration determinable by a laser interferometric technique. The position of the sensing probe may be inferred by the relationship of the amplitude of vibration of the vibrating cantilever and the distance of the cantilever from the target surface. Thus, the positioning procedure is one that leads to an accurate initial positioning of the sensing tip and one in which the sensing tip never makes contact with the target surface to be imaged or measured. This automatic positioning procedure is one that is accomplished in three increasingly precise steps:

First, the vibrating sensing probe is lowered quickly to a setpoint position above the target surface, as determined by a focusing system. The method may be that of any known method such as an optical registration or focusing method/approach.

Steps two and three of the approach utilize the amplitude of vibration of the vibrating cantilever. Namely, the position of the approaching sensing probe is controlled by tracking the amplitude of vibration of the vibrating cantilever as well as tracking an amplitude-distance gradient (dA/dD).

More specifically, in the second step of the approach, the vibrating cantilever is lowered into an acoustic coupling region. As the bottom of the vibrating cantilever is brought closer to the sample surface, air between the cantilever and target surface is compressed and the amplitude of vibration of the vibrating cantilever is dampened, while still vibrating at its operating frequency. The dampening of the vibrating cantilever throughout the acoustic coupling region is detectable. Accordingly, as the cantilever approaches the target surface, the resulting amplitude of vibration of the vibrating cantilever is processed as a percentage of the undampened signal. When a predefined setpoint percentage is reached, typically at a distance no more than one to ten microns from the target surface, the approach method switches to a final approach step which traverses the sensing probe from the acoustic coupling region through a transition region and into an atomic interaction region.

In the third step of the approach, atoms at the end of the tip and atoms on the target surface are attracted by Van der Waals forces. The Van der Waals forces are conservative, spring-like atomic forces that further attract the tip to the target surface, resulting in a shift in resonant frequency of the vibrating cantilever. Accordingly, as the cantilever further approaches the target surface, the the resultant amplitude-distance gradient (DA/dD) is monitored for a desired gradient. When the desired gradient is reached, the positioning approach is complete. This final, most precise, step of the approach brings the tip to its ideal scanning distance, about 30 Angstroms from the target surface, without ever contacting the target surface.

In one embodiment, a non-contact method of positioning a sensing probe, having a vibrating cantilever and tip, above a target surface includes the following steps: Lowering the sensing probe to a first position above the target surface by a standard optical focusing method. Next, further lowering the sensing probe to a second position above the target surface, and in a region where the vibrating cantilever interacts acoustically with the target surface. Lastly, further lowering the sensing probe to a third and final position above the target surface, and in a region where the tip interacts atomically with the target surface.

The non-contact positioning of the sensing probe is critical in certain manufacturing processes, since it allows measurements to be made without damaging or destroying the product or the sensing probe. Because the probe tip never comes in contact with the target surface, samples are not changed in any way and the process eliminates losses associated with destructive testing. The measured product may then be reinserted into the manufacturing process.

DETAILED DESCRIPTION OF THE INVENTION

Figure 1:
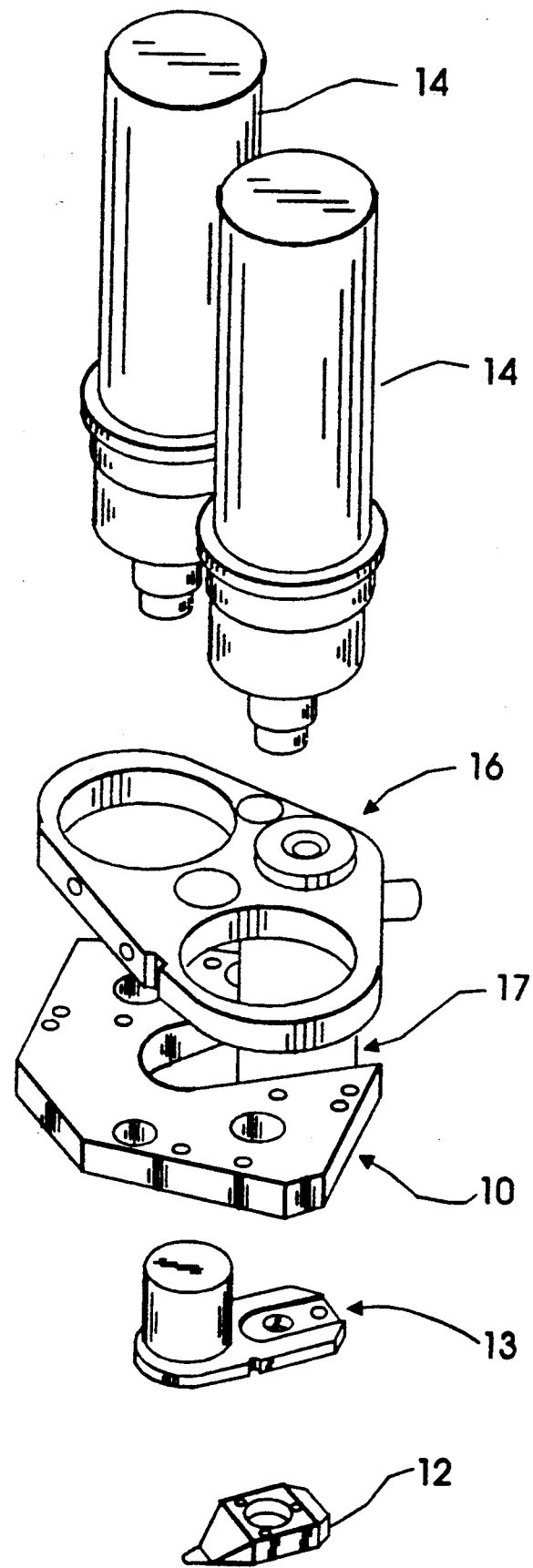
FIG. 1 is an exploded perspective view of a tip approach system for a scanning probe microscope.

The assembly of FIG. 1 is used in a sensing probe microscope. It includes a base plate 10 which provides a reference surface with respect to which a bimorph sensing probe assembly 12 is moved. A pair of approach actuators 14 (commercially available as IW-701 actuator and manufactured by Burleigh Instruments Inc.) are attached to a holder plate 16 such that the lower most extremity of the approach actuators 14 bear against the upper surface of the base plate 10. The holder plate 16 has a calibrated Z piezo actuator 17 which extends downwardly therefrom and carries, at its lower most end, a microscope objective 13. The piezo actuator 17 is used essentially in a scanning procedure. The microscope objective 13 carries the sensing probe 12 at its lower end. The microscope objective 13 includes an objective lens through which a laser is focused. The function of the objective lens is not critical to positioning the sensing probe 12, and is used essentially for viewing a sample (not shown). This sensing probe 12 is, accordingly, raised and lowered relative to a target surface (not shown) below the sensing probe 12 by actuation of the approach actuators 14 which move the plate 16 up and down with respect to the base plate 10.

In the preferred embodiment of the invention, the approach actuators 14 are moved in tandem. In an alternative embodiment, more than two approach actuators 14 may be used with independent movement, and in fact may be desired, in order to adjust positioning or to provide a tilt feature or function. The probe tilting feature of U.S. Pat. No. 5,103,095 is illustrative of a mechanism which is capable of performing this function should it be desired as part of the present system.

Figure 2:
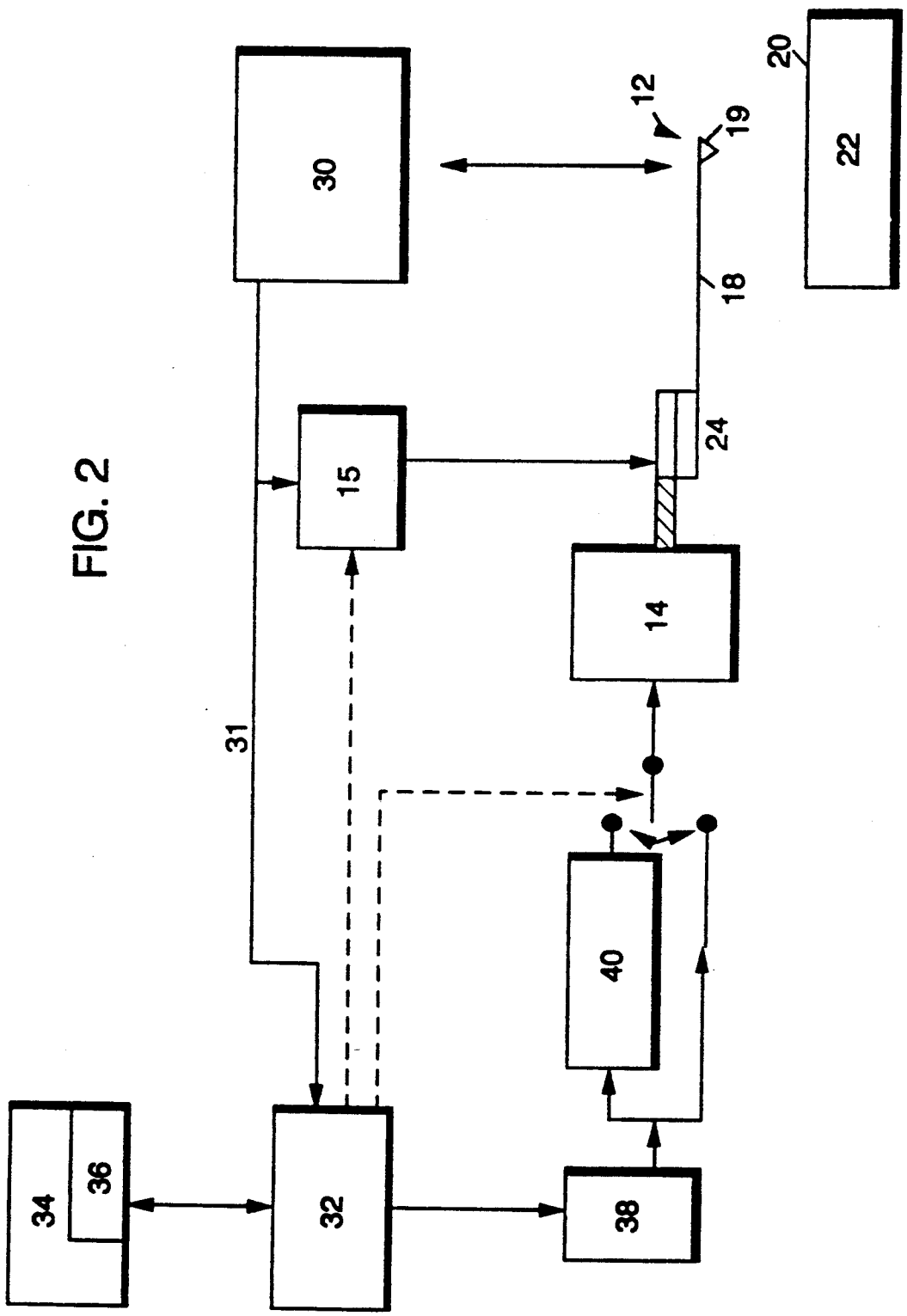
FIG. 2 is a block diagram illustrating an implementation of a sensing probe positioning system in a scanning probe microscope according to the present invention.

Referring next to FIG. 2, a block diagram of the scanning probe microscope control and positioning circuitry is illustrated. The sensing probe 12, comprising a cantilever 18 having a microminiature tip 19 integrally formed or mounted at one end and a small piezoelectric element 24 at the opposite end, is vertically positioned above a target surface 20 of a sample 22. An excitation signal vibrates the cantilever/tip combination at a frequency slightly greater than the resonant frequency of the cantilever 18. The piezoelectric element 24 is used to yield a constant amplitude of vibration of the vibrating cantilever 18. In addition, the piezoelectric element 24 (upon application of an appropriate voltage signal) can also move the cantilever 18, upwardly and downwardly (in a Z direction), with respect to the target surface 20 for very small adjustments (less than one micron). In the preferred embodiment, the piezoelectric element 24 is a bimorph piezoelectric element (i.e., piezoelectric slabs joined together), but may also be either a piezoelectric plate or tube. The piezoelectric element 24 needs to be able to move the tip end of the cantilever 18 up and down about one micron so that the optimal operating point, defined as setpoint gap, may be established.

The amplitude of vibration of the vibrating cantilever 18 is monitored by a heterodyne laser interferometer 30. Laser interferometric techniques are well known, with the output of the interferometer 30 representing the amplitude of vibration of the vibrating cantilever 18, and thereafter supplied to a controller 32 and a analog servo circuit 15. In the preferred embodiment, a heterodyne laser interferometer 30 monitors the amplitude of vibration of the vibrating cantilever, although other monitoring techniques will be recognized by those skilled in the art. Accordingly, a laser source incident upon the vibrating cantilever 18 is reflected back to the laser interferometer 30. The reflected laser light returning from the cantilever 18 is combined with a reference beam that has been frequency shifted 80 Mhz relative to the tip beam. An interference, resulting in an 80 Mhz sinusoidal beat frequency, is phase modulated by the tip vibration. A phase demodulator and lock-in amplifier (part of laser interferometer 30) converts the tip vibration modulation into a voltage $V_a$, which in magnitude is proportional to the tip vibration amplitude.

A control signal output from the controller 32 is provided to a piezo driver 38 which serves to drive the approach actuators 14, either directly or through a smoothing filter 40, to vertically position, control, or maintain the vertical position of the sensing probe 12. The smoothing filter 40 is optionally selectable by the controller 32 and serves to smooth a drive signal generated by the piezo driver 38 and eliminates unacceptable large motion, noise, or spikes that would otherwise cause the sensing probe 12 to be driven into the target surface 20. The approach actuators 14 along with the smoothing filter 40 provide versatile and precise performance including adjustable speed of movement (2 mm/sec to 10 microns/sec), rapid deceleration, fine resolution, uniform smoothness, uniaxial motion, rigidity and thermal stability. In the preferred embodiment, the smoothing filter 40 is active during the second and third positioning steps of lowering the sensing probe 12 above the target surface 20.

The controller 32 may comprise hardware and/or software from a single, distributed or a combination of sources. The controller 32 may optionally be connected to a computer 34 containing memory 36 and, additionally, controller 32 outputs positional requests to X and Y control electronics (not shown), which provide X and Y positional signals to a scanning circuit (not shown) and piezo actuator 17. In the preferred embodiment of the invention, the controller 32 hardware comprises a local processor (not shown), remote processor (not shown), programmable digital signal processor (PDSP) (not shown), and PS/2 (PS/2 is a trademark of the International Business Machines Corporation) computer (not shown). Further, as the tip 19 is scanned across the target surface 20, and as the tip to target surface gap changes, the laser interferometer 30 will detect the change in vibration amplitude of the vibrating cantilever providing the voltage $V_a$ as input to the analog servo circuit 15. The analog servo circuit 15 provides a signal to the piezoelectric element 24, to adjust the position of the tip, up or down, to maintain the original amplitude of vibration of the vibrating cantilever. A hierarchical input, process, and output diagram is provided for each of the hardware devices of the preferred embodiment and included as Table A.

TABLE A

Software control for the three phases of auto-approach:

Phase 1:

Local Processor

| Inputs | Process | Outputs |
|---|---|---|
| Commands from PDSP | Task loop | Clock lines on Inchworm |
| Status from Remote | If timeout | Status to PDSP |
| Internal timer | Stop all motion | Internal Timers |
| Commands to remote | End Task | Commands to Remote |
| | Task loop | |
| | If Status from Remote | |
| | Reset Timer | |
| | End Task | |
| | Task loop | |
| | case fast motion | |
| | command from PDSP | |
| | Turn on high speed clock | |
| | case slow motion | |
| | command from PDSP | |
| | Set toggle speed to motion timer | |
| | case command to forward to Remote | |
| | End Task | |

Remote Processor

| Inputs | Process | Outputs |
|---|---|---|
| Position Detector (Coarse focus) | Compare Algorithm | Status of Approach unit above/below focus |
| Position Detector (Auto approach) | Check for connections | Inhibit/Non-Inhibit |
| Command from Local | Check for Proximity | of coarse positioner |
| | Check for Noise | motion |
| | Check for absolute Position | |

PDSP

| Inputs | Process | Outputs |
|---|---|---|
| Status from Remote | Task loop | Status of controller |
| Commands from PS/2 | get status from | Motion command to |
| State of Inchworms | Remote | Local IW control |
| | End Task | Commands to Remote |
| | Task loop | |
| | If command from PS/2 | |
| | case Get Status | |
| | Send Status | |
| | case Move Inchworm | |
| | Forward command | |
| | End If | |
| | End Task | |
| | Task loop | |
| | If Signal from Feedback system lost | |
| | Stop all motion on inchworm | |
| | End If | |
| | End Task | |

PS/2

| Inputs | Process | Outputs |
|---|---|---|
| Status from PDSP | While Auto approach unit above focus | Commands to PDSP |
| | Send Move High Speed command to PDSP | System Log |
| | End While | Display Screen |
| | Task loop | |
| | Check for communication | |

TABLE A-continued

Software control for the three phases of auto-approach:

```
                    connection with PDSP
                    End Task
                    Task loop
                       Update display
                    End Task
                    Task loop
                       Update system log
                    End Task
Phase II:
                              PS/2
Inputs              Process                        Outputs
Parameter Files     Get data from PDSP             Display Screen
Graphical User      Determine Threshold            PDSP Commands
  Interface           values for event             PDSP Get value commands
PDSP returned         detection                    PDSP Set value commands
  Signals data      Send Threshold and event
PDSP returned         conditions to PDSP
  Status            Send "APPROACH" command
                      to PDSP
                    While Controller status
                    .NE. APPROACHED
                       Wait
                    End While
                              PDSP
Inputs              Process                        Outputs
Commands from PS/2  Get values from PS/2           Status to PS/2
Values from PS/2      into memory                  Commands to Local
Values from DACs    Get Signal values from
                      DACs
                    Loop
                       If Signal values
                       in range of threshold
                       calculated in PS/2 for
                       event set by PS/2
                          Send Stop Motion command
                          Set Status ON SURFACE
                          Exit Loop
                       End If
                       Get Signal Values from
                       DACs
                       Command to Local for
                       Slow motion of
                       Inchworms
                    End Loop.
                    Task loop
                       If Signal from Feedback
                    system lost
                          Stop all motion on
                          inchworm
                       End If
End Task
                              LOCAL
Inputs              Process                        Outputs
                    *************** SEE PHASE I ************************
Phase III:
                              PS/2
Inputs              Process                        Outputs
Values from PDSP    Loop until dA/dD               Display screen
Parameter Files     at threshold                   Commands to PDSP
User inputs            Loop n times                Values to PDSP
                          Vary Setpoint
                          delay
                          Get depth value
                       End Loop
                       Compute delta A/delta D
                       Adjust Inchworm position
                         up or down as needed
                       Adjust Excitation value
                         up or down as needed
                    End Loop
                              PDSP
Inputs              Process                        Outputs
Commands from PS/2  Task loop                      Status to PS/2
Values from PS/2       case Motion command         Commands to Local
Values from DACs          Send Motion command      Values to PS/2
                          to Local
                       case Set value
                          Set proper ADC
                       case Get value
```

TABLE A-continued

Software control for the three phases of auto-approach:

```
         Get proper DAC value
         and send to PS/2
     End Task
     Task loop
       If Signal from Feedback
       system lost
         Stop all motion on
         inchworm
       End If
     End Task
         LOCAL
```

In the first step of approach, the sensing probe is lowered quickly to a first position P1 above the target surface. The approaching sensing probe 12 is lowered at a relatively fast rate on the order of 2 mm/sec. The method may be that of any known method such as an optical registration or focusing method/approach, by sensing an optical focal point between the sensing probe 12 ant the target surface 20.

Figure 3:
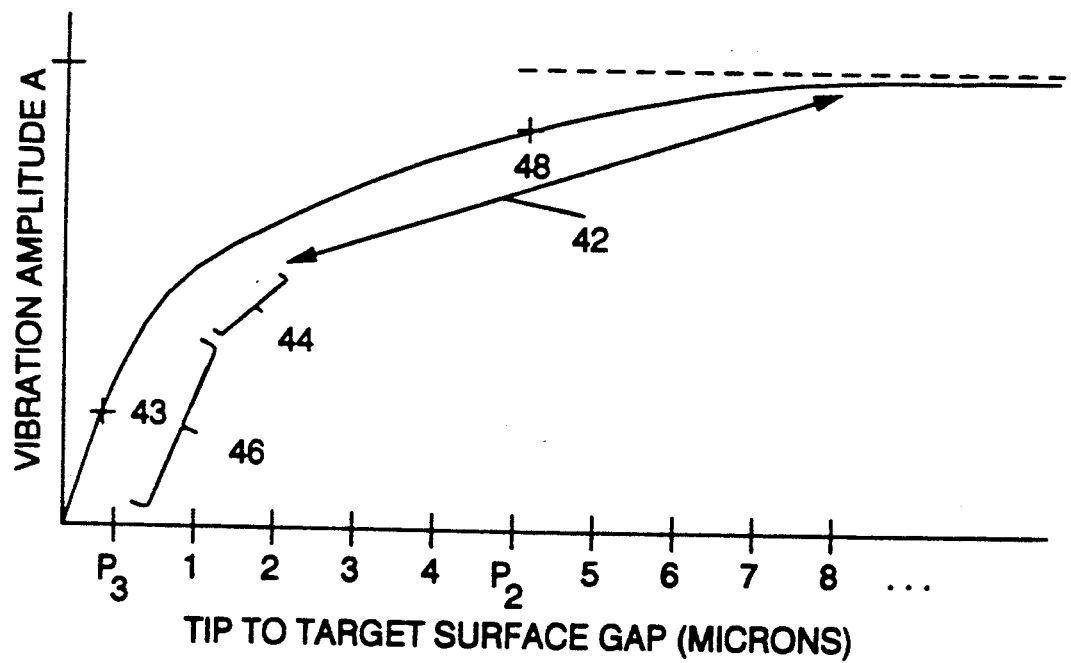
FIG. 3 is a graphical representation of the amplitude of vibration of a vibrating cantilever vs. the tip to target surface gap according to the present invention.

Two separate phenomena affect the nature and amplitude of vibration of the vibrating cantilever upon further approach of the sensing probe 12 from the first position P1 to the target surface. FIG. 3 is a graphical representation of the amplitude of vibration of the vibrating cantilever vs. tip to target surface gap, illustrating the effect of the two phenomena. As illustrated in FIG. 3, an approaching sensing probe 12 exhibits an amplitude of vibration decay, or gradient, while traversing an acoustic coupling region 42, a transition region 44, and an interaction region 46. The gradient is hereafter described as the incremental change in amplitude of vibration of the vibrating cantilever 18 for each incremental change in distance of the approaching sensing probe 12. As such, the gradient is defined as (dA/dD) and may further be represented as the slope or derivative of the amplitude of vibration vs. distance curve of FIG. 3.

Setpoints or gradients along the amplitude of vibration vs. distance curve provide the controller 32 a means to position and control the sensing probe 12 above the target surface 20 as described accordingly in the preferred embodiment of the invention.

In the second step of the approach, the vibrating cantilever 18 is lowered from the first position P1 into acoustic coupling region 42 where the amplitude of vibration of the vibrating cantilever 18 is dampened as a result of an acoustic coupling between the vibrating cantilever 18 and the target surface 20. Forces on the cantilever 18 due to acoustic coupling forces change the amplitude of vibration of the vibrating cantilever 18 as the sensing probe 12 approaches target surface 20. In the preferred embodiment, the rate of approach during the second step is 100 microns/sec.

Figure 4:
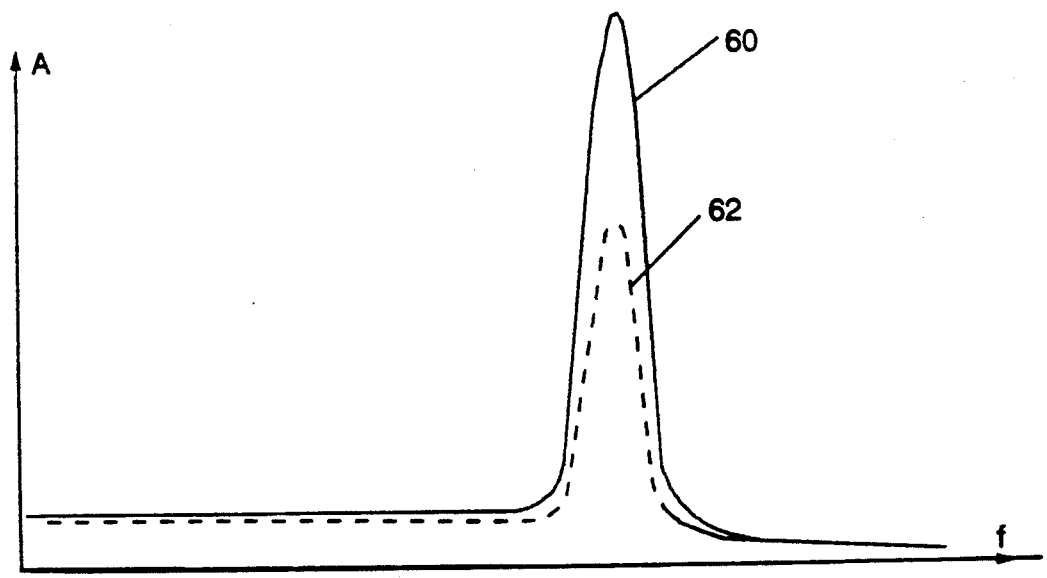
FIG. 4 is a graph illustrating the effect of acoustic dampening on a vibrating cantilever.

The dampening phenomenon in this region occurs as the bottom of the vibrating cantilever is brought closer to the sample surface. Air between the vibrating cantilever 18 and target surface 20 is compressed, creating air force gradients, causing the amplitude of vibration of the vibrating cantilever 18 to be dampened. The general effect of acoustic dampening is illustrated in FIG. 4. As shown, the amplitude of vibration of a dampened signal 62 is less than that of an undampened signal 60, while maintaining the same resonant frequency.

Accordingly, a setpoint percentage is defined as the ratio of the amplitude of vibration of the dampened vibrating cantilever to the amplitude of vibration of the undampened vibrating cantilever. In the preferred embodiment, the value of the setpoint percentage is established to result in a second position, P2. The second position P2 further defining a tip to target surface gap of approximately one to ten microns.

In the third step of the approach, the sensing probe 12 approaches the target surface 20 from the second position P2. Along with the acoustic coupling, Van der Waals force gradients change the resonant frequency of the vibrating cantilever 18 during the approach. The Van der Waals force is a spring-like force wherein atoms (not shown) at the end of the tip 12 and atoms (not shown) on the target surface 20 weakly interact. The effect of Van der Waals forces on a vibrating cantilever 18 and tip 19 is described in the article AFM—Force Mapping and Profiling on a Sub 100 Angstrom Scale by Martin, et al, and is provided as Appendix A.

Once in the interaction region 46, the tip 19 is close enough to the surface that Van der Waals interaction becomes by far the most influential component influencing the amplitude of vibration of the vibrating cantilever 18. Acoustic coupling still exists, but is overwhelmed by the effect of the Van der Waals force gradient. The interaction region 46 is also characterized by much greater sensitivity of the amplitude of vibration of the vibrating cantilever as a function of tip to target surface gap. It is this increased sensitivity that is measured and used as the indicator for the final step of the automatic approach. That is, an incremental change in tip to target surface gap results in a large change in vibration amplitude of vibration in the interaction region 46. In the preferred embodiment, the rate of approach from the second position P2 toward the target surface is 10 microns/sec.

During the third step of approach, the excitation signal is first increased in order to set the amplitude of vibration of the vibrating cantilever 18 to a setpoint S. As a result, the tip 19 tends to vibrate with a larger amplitude due to the increased excitation signal. In response thereto, the analog servo circuit 15, brings the tip 19 closer to the target surface, using the piezoelectric element 24, in order to maintain a constant amplitude of vibration. The approach actuators 14 then tend to move the sensing probe 12 toward the target surface 20 while the analog servo circuit 15 tends to move the sensing probe 12 away from the target surface 20, so as to minimize the extension of the piezoelectric element 24 while maintaining the tip to target surface gap. The gradient (dA/dD) is then measured by first producing incremental changes in the amplitude of vibration of the vibrating cantilever by varying the excitation signal in an A.C. fashion. Incremental changes in tip to target surface gap results as the analog servo circuit 15 moves the tip closer to, or away from, the target surface 20 using the piezoelectric element 24. The gradient is then established as the ratio of the incremental change in amplitude of vibration of the vibrating cantilever to the incremental change in tip to target surface gap. Initially, while still in the acoustic coupling region, the gradient dA/dD will have a value approximately less than 0.0001. The above process is iterated until the gradient, dA/dD is greater than 0.01. That is, the approach is iterated until the slope is greater than 0.01. At this point the tip 19 reaches its third and final position P3, a substantially optimized scanning distance of approximately 30 Angstroms and at the desired setpoint gap.

Figure 5A:
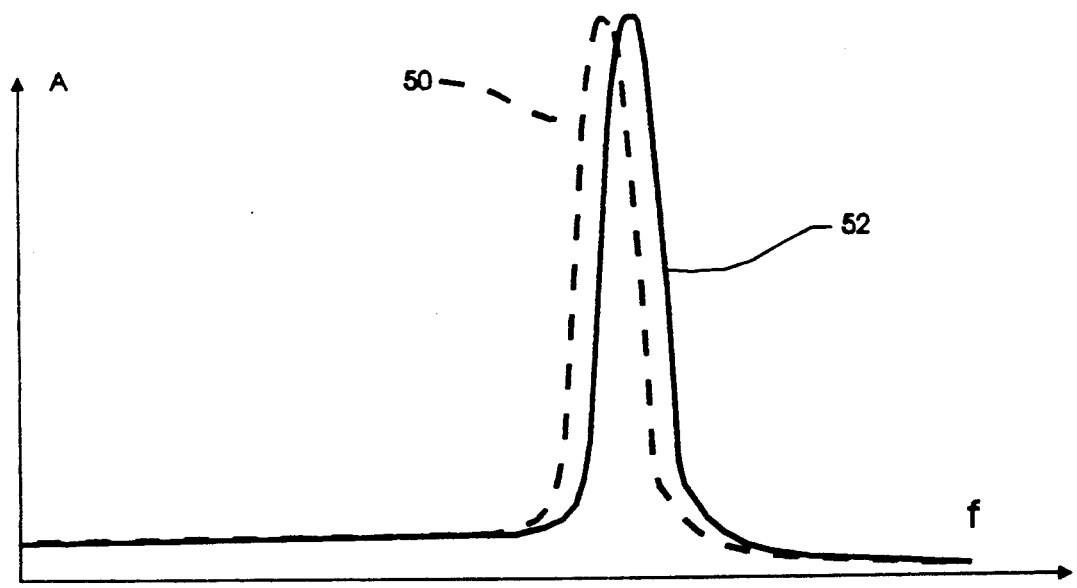
FIG. 5a is a a graph illustrating the effect of Van der Waals forces on the resonant frequency of a vibrating cantilever.

The selection of the preferred operating frequency for the cantilever/tip assembly will be described in terms of the amplitude-frequency characteristic of the vibrating cantilever. The amplitude-frequency characteristic of an undampened, vibrating cantilever is illustrated as 52 in FIG. 5a. As is typical of frequency dependent devices, the vibrating cantilever exhibits a maximum frequency, or resonant frequency, resulting in a maximum amplitude. The amplitude-frequency characteristic of a vibrating cantilever in the presence of a spring-like force (such as Van der Waals force) displays a shifted behavior 50 in FIG. 5a. Again, as with frequency dependent devices, 50 in FIG. 5a is equivalent to an amplitude-frequency curve for a device subjected to an external spring-like force. Thus, for a given frequency, a change in amplitude of vibration due to a spring-like force is predictable by comparing the change in amplitude of the two amplitude-frequency curves 50, 52 in FIG. 5a.

In the preferred embodiment of the invention, the cantilever is energized to vibrate at a drive frequency, a fraction of a percent greater than its resonant frequency. Resonant frequencies of typical cantilevers range from approximately 20 KHz to 1 Mhz. A cantilever having a resonant frequency of 400 KHz, for example, may be energized at a drive frequency of 401 KHz, illustrating an embodiment of the magnitude of the shift in frequency. When the vibrating cantilever 18 approaches the target surface 20 forces tend to shift the resonant characteristic of the vibrating cantilever 18. Upon the imposition of this external spring-like force (such as the Van der Waals force) the change in amplitude of vibration of the vibrating cantilever is equal to the change in amplitude for the two resonant frequency curves 50, 52 for a given drive frequency. The amplitude of vibration of the vibrating cantilever will increase when the resonant frequency moves toward the drive frequency and, correspondingly, will decrease when the resonant frequency moves away from the drive frequency.

Figure 5B:
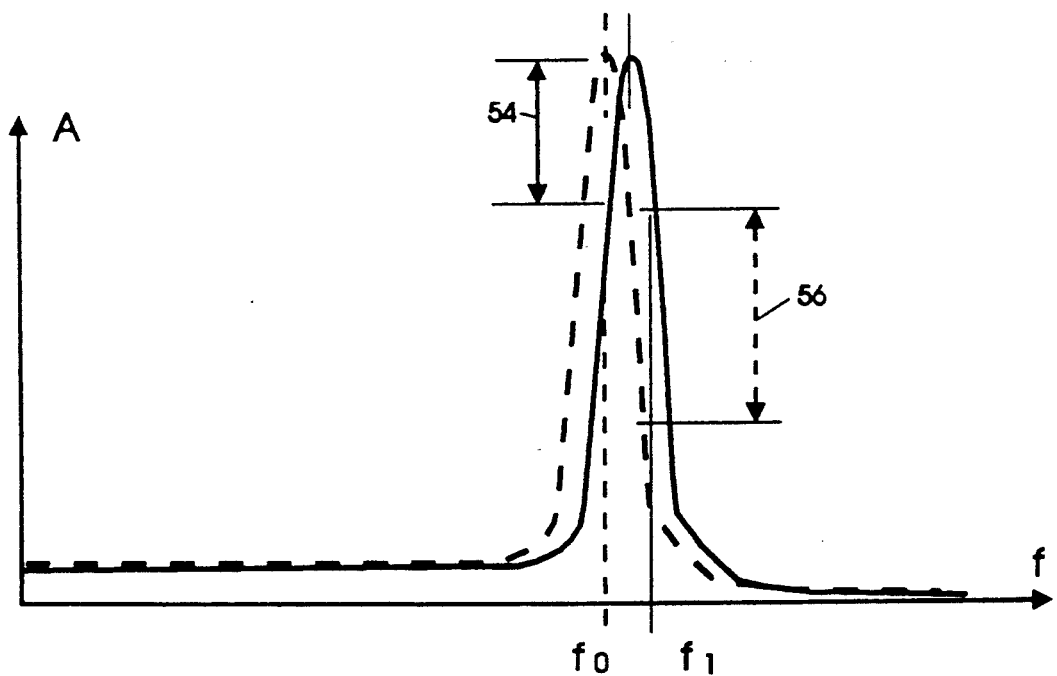
FIG. 5b is a is a graph illustrating the change in amplitude of vibration for a dampened vibrating cantilever due to a shift in resonant frequency.

As illustrated in FIG. 5b, a drive frequency equal to the resonant frequency ($f_0$) yields little change in amplitude of vibration 54 for a vibrating cantilever 18 having undergone a shift in resonance. As further illustrated in FIG. 5b, a drive frequency slightly greater than the resonant frequency yields a greater change in amplitude of vibration 56 for a given drive frequency ($f_1$). Thus, in order to provide for a greater detectable change in amplitude, a drive frequency slightly greater than the resonant frequency is selected.

The invention has been described above in connection with a preferred embodiment, including monitoring the effect of atomic interaction between a sensing probe 12 and target surface 20. The sensing probe 12, of the preferred embodiment, detects Van der Waals force interaction between the tip 19 and target surface 20. However, sensing probes of alternative scanning probe microscopes embodiments may detect such forces as electrical potential, magnetic, capacitive, or chemical potential forces. Those of skill in the art will readily recognize that alternative embodiments of the invention can be implemented by applying the method disclosed herein to include electrical potential, magnetic, capacitive, or chemical potential forces which do not depart from the spirit and scope of the invention as defined in the following claims.

We claim:

1. A non-contact method of positioning a sensing probe, having vibrating cantilever and tip, from a first position above a target surface comprising the steps of:
    lowering said sensing probe to a second position above said target surface, said second position comprising a region where said sensing probe interacts acoustically with said target surface, and
    further lowering said sensing probe to a third and final position above said target surface, said third position comprising a region where said sensing probe interacts atomically with said target surface.

2. The method as in claim 1, wherein:
    said acoustical interaction comprises an air force gradient, and
    said atomic interaction comprises a Van der Waals force.

3. The method as in claim 1, wherein:
    said first position is determined by positioning said sensing probe by sensing an optical focal point between said sensing probe and said target surface;
    the step of lowering said sensing probe to said second position further comprises sensing an acoustic coupling between said sensing probe and said target surface, and
    the step of lowering said sensing probe to said third position further comprises sensing an atomic force interaction between said sensing probe and said target surface.

4. The method as in claim 3, wherein:
    said first position is approximately 1 mm above said target surface;
    said second position is approximately 1–10 microns above said target surface, and
    said third position is approximately 10–100 Angstroms above said target surface.

5. The method as in claim 4, wherein:
    said step of positioning said probe to said first position is at a rate of approximately 2 mm/sec;
    said step of lowering said probe to said second position is at a rate of approximately 100 microns/sec, and
    said step of lowering said probe to said third position is at a rate of approximately 10 microns/sec.

6. The method as in claim 5, wherein:
    said acoustical interaction comprises an air force gradient, and
    said atomic interaction comprises a Van der Waals force.

7. The method as in claim 1, wherein:
    said acoustical interaction precipitates a dampened amplitude of vibration for said vibrating cantilever, and
    said atomic interaction precipitates a further dampened amplitude of vibration for said vibrating cantilever.

8. The method as in claim 7, wherein:

said acoustical interaction with said target surface is monitored as a ratio of the amplitude of vibration of said dampened vibrating cantilever to the amplitude of vibration of said undampened vibrating cantilever, and said atomic interaction with said target surface is monitored as a ratio of a change in the amplitude of vibration of said dampened vibrating cantilever with respect to a change of the distance of said tip to said target surface.

9. The method as in claim 8, wherein:

said acoustical interaction comprises an air force gradient, and said atomic interaction comprises a Van der Waals force.

10. A non-contact method of automatically positioning a sensing probe, having a vibrating cantilever and tip, above a target surface comprising the steps of:

lowering said sensing probe to a first position above said target surface using optical focusing;

further lowering said sensing probe to a second position above said target surface, said second position comprising a region where said vibrating cantilever interacts acoustically with said target surface, and further lowering said sensing probe to a third and final position above said target surface, said third position comprising a region where said tip interacts atomically with said target surface.

11. The method as in claim 10, wherein:

said acoustical interaction comprises an air force gradient, and said atomic interaction comprises a Van der Waals force.

12. The method as in claim 10, wherein:

said optical focusing comprises sensing an optical focal point between said sensing probe and said target surface;

the step of lowering said sensing probe to said second position further comprises sensing an acoustic coupling between said sensing probe and said target surface, and the step of lowering said sensing probe to said third position further comprises sensing an atomic force interaction between said sensing probe and said target surface.

13. The method as in claim 12, wherein:

said first position is approximately 1 mm above said target surface;

said second position is approximately 1–10 microns above said target surface, and said third position is approximately 10–100 Angstroms above said target surface.

14. The method as in claim 13, wherein:

said step of positioning said probe to said first position is at a rate approximately 2 mm/sec;

said step of lowering said probe to said second position is at a rate of approximately 100 microns/sec, and said step of lowering said probe to said third position is at a rate of approximately 10 microns/sec.

15. The method as in claim 14, wherein:

said acoustical interaction comprises an air force gradient, and said atomic interaction comprises a Van der Waals force.

16. The method as in claim 10, wherein:

said acoustical interaction precipitates a dampened amplitude of vibration for said vibrating cantilever, and said atomic interaction precipitates a further dampened amplitude of vibration for said vibrating cantilever.

17. The method as in claim 16, wherein:

said acoustical interaction with said target surface is monitored as a ratio of the amplitude of vibration of said dampened vibrating cantilever to the amplitude of vibration of said undampened vibrating cantilever, and said atomic interaction with said target surface is monitored as a ratio of a change in the amplitude of vibration of said dampened vibrating cantilever with respect to a change of the distance of said tip to said target surface.

18. The method as in claim 17, wherein:

said acoustical interaction comprises an air force gradient, and said atomic interaction comprises a Van der Waals force.

19. A non-contact method of automatically positioning a sensing probe, having a vibrating cantilever and tip, above a target surface comprising the steps of:

lowering said sensing probe to a first position above said target surface using optical focusing comprising sensing an optical focal point between said sensing probe and said target surface;

further lowering said sensing probe to a second position above said target surface, said second position comprising a region where said vibrating cantilever is acoustically coupled with said target surface, and further lowering said sensing probe to a third and final position above said target surface, said third position comprising a region where Van der Waals forces effect the interaction of said tip with said target surface.

20. The method as in claim 19, wherein:

said first position is approximately 1 mm above said target surface;

said second position is approximately 1–10 microns above said target surface, and said third position is approximately 10–100 Angstroms above said target surface.

21. The method as in claim 20, wherein:

said step of positioning said probe to said first position is at a rate of approximately 2 mm/sec;

said step of lowering said probe to said second position is at a rate of approximately 100 microns/sec, and said step of lowering said probe to said third position is at a rate of approximately 10 microns/sec.

22. The method as in claim 19, wherein:

said acoustical interaction precipitates a dampened amplitude of vibration for said vibrating cantilever, and said atomic interaction precipitates a further dampened amplitude of vibration for said vibrating cantilever.

23. The method as in claim 22, wherein:

said acoustical interaction with said target surface is monitored as a ratio of the amplitude of vibration of said dampened vibrating cantilever to the amplitude of vibration of said undampened vibrating cantilever, and said atomic interaction with said target surface is monitored as a ratio of a change in the amplitude of vibration of said dampened vibrating cantilever with respect to a change of the distance of said tip to said target surface.

24. The method as in claim 23, wherein:
said first position is approximately 1 mm above said target surface;
said second position is approximately 1-10 microns above said target surface, and
said third position is approximately 10-100 Angstroms above said target surface.

25. A scanning probe microscope having a sensing probe mounted for non-contact vertical movement, for positioning the sensing probe above a target surface comprising:
a cantilever having a microminiature tip at one end, and a piezoelectric bimorph at the opposite end, said piezoelectric bimorph providing a means for vibrating said cantilever at a drive frequency, said cantilever carried by said sensing probe;
means for monitoring the amplitude of vibration of said vibrating cantilever, and
means, in response to said monitoring means, for automatically positioning said sensing probe.

26. The apparatus as in claim 25 wherein:
said drive frequency at which said cantilever is vibrated is a frequency greater than its resonant frequency.

27. A scanning probe microscope having a sensing probe, including a tip and vibrating cantilever, mounted for non-contact vertical movement, above a target surface, comprising:
means for monitoring the amplitude of vibration of said vibrating cantilever, and
means, responsive to said monitoring means, for automatically lowering said sensing probe in increasingly precise steps.

28. The apparatus as in claim 27, wherein said means for automatically lowering comprises:
lowering said probe to a first position at a rate of approximately 2 mm/sec;
lowering said probe to a second position at a rate of approximately 100 microns/sec, and
lowering said probe to a third position at a rate of approximately 10 microns/sec.

29. The apparatus as in claim 27, wherein said means for automatically lowering comprises:
an optical focusing means;
an acoustical interaction detection means, and
a Van der Waals force detection means.

30. The apparatus as in claim 27, wherein said means for automatically lowering comprises:
lowering said probe to a first position at a distance of approximately 1 mm above said target surface;
lowering said probe to a second position at a distance of approximately one to ten microns above said target surface, and
lowering said probe to a third position at a distance of approximately 30 Angstroms above said target surface.

* * * * *